(12) United States Patent
Ebihara et al.

(10) Patent No.: US 7,809,956 B2
(45) Date of Patent: Oct. 5, 2010

(54) CONTENT-DATA PROCESSING APPARATUS, CONTENT-DATA PROCESSING METHOD, CONTENT DATA MANAGEMENT SYSTEM AND CONTENT DATA MANAGEMENT METHOD

(75) Inventors: Munetake Ebihara, Kanagawa (JP); Mitsuru Katsumata, Tokyo (JP)

(73) Assignee: Sony Corporation, Tokyo (JP)

( * ) Notice: Subject to any disclaimer, the term of this patent is extended or adjusted under 35 U.S.C. 154(b) by 1028 days.

(21) Appl. No.: 10/972,382

(22) Filed: Oct. 26, 2004

(65) Prior Publication Data

US 2005/0105739 A1 May 19, 2005

(30) Foreign Application Priority Data

Nov. 18, 2003 (JP) .............................. 2003-388242

(51) Int. Cl.
  G06F 11/30 (2006.01)
  G06F 12/14 (2006.01)
  G06F 7/04 (2006.01)
  G06F 17/30 (2006.01)
(52) U.S. Cl. .................. 713/189; 713/193; 726/26; 726/31; 705/59
(58) Field of Classification Search ............. 713/189, 713/193; 705/59; 726/26, 31
See application file for complete search history.

(56) References Cited

U.S. PATENT DOCUMENTS

| | | | | |
|---|---|---|---|---|
| 6,697,944 B1* | 2/2004 | Jones et al. | ................. | 713/168 |
| 6,862,604 B1* | 3/2005 | Spencer et al. | ............. | 707/205 |
| 7,484,103 B2* | 1/2009 | Woo et al. | ................... | 713/189 |
| 2002/0002413 A1* | 1/2002 | Tokue | .......................... | 700/94 |
| 2002/0114466 A1* | 8/2002 | Tanaka et al. | .............. | 380/232 |
| 2003/0005135 A1* | 1/2003 | Inoue et al. | .................. | 709/229 |
| 2003/0016829 A1* | 1/2003 | Chu | ............................ | 380/281 |
| 2003/0028488 A1* | 2/2003 | Mohammed et al. | .......... | 705/59 |
| 2003/0053631 A1* | 3/2003 | Un | .............................. | 380/277 |
| 2003/0084306 A1* | 5/2003 | Abburi et al. | ............... | 713/188 |
| 2003/0152222 A1* | 8/2003 | Nakano et al. | ............. | 380/201 |
| 2003/0185397 A1* | 10/2003 | Ishiguro | ..................... | 380/277 |
| 2005/0060544 A1* | 3/2005 | Huang et al. | ................ | 713/165 |
| 2005/0066267 A1* | 3/2005 | Kanai | .......................... | 715/513 |
| 2005/0071744 A1* | 3/2005 | Dunbar et al. | ........... | 715/500.1 |
| 2005/0081042 A1* | 4/2005 | Venkatesan et al. | ........ | 713/176 |
| 2005/0210277 A1* | 9/2005 | Nagai et al. | ................ | 713/193 |
| 2005/0229257 A1* | 10/2005 | Kim et al. | ..................... | 726/27 |
| 2006/0080742 A1* | 4/2006 | Nakayama et al. | ............ | 726/27 |
| 2006/0294017 A1* | 12/2006 | Kim et al. | .................... | 705/59 |

(Continued)

FOREIGN PATENT DOCUMENTS

JP  10-177523  6/1998

(Continued)

Primary Examiner—William R Korzuch
Assistant Examiner—Sarah Su
(74) Attorney, Agent, or Firm—Oblon, Spivak, McClelland, Maier & Neustadt, L.L.P.

(57) ABSTRACT

In a music-content management system, a client handles three types of data, i.e., a file for encrypting content and storing the content, a key that encrypted the content, and a use condition description for each service in which the content is used. The file stores one type of content encryption system and one type of encrypted content. The file also stores information regarding use condition descriptions for respective services.

21 Claims, 10 Drawing Sheets

U.S. PATENT DOCUMENTS

2007/0044159 A1* 2/2007 Ishiguro .................. 726/27
2009/0183001 A1* 7/2009 Lu et al. .................. 713/168

FOREIGN PATENT DOCUMENTS

| JP | 2000-035885 | 2/2000 |
| JP | 2000-048076 | 2/2000 |
| JP | 2001-103047 | 4/2001 |
| JP | 2001-282258 | 10/2001 |
| JP | 2001-325460 | 11/2001 |
| JP | 2002-197069 | 7/2002 |
| JP | 2002-288376 | 10/2002 |
| JP | 2004-0220357 | 5/2004 |

* cited by examiner

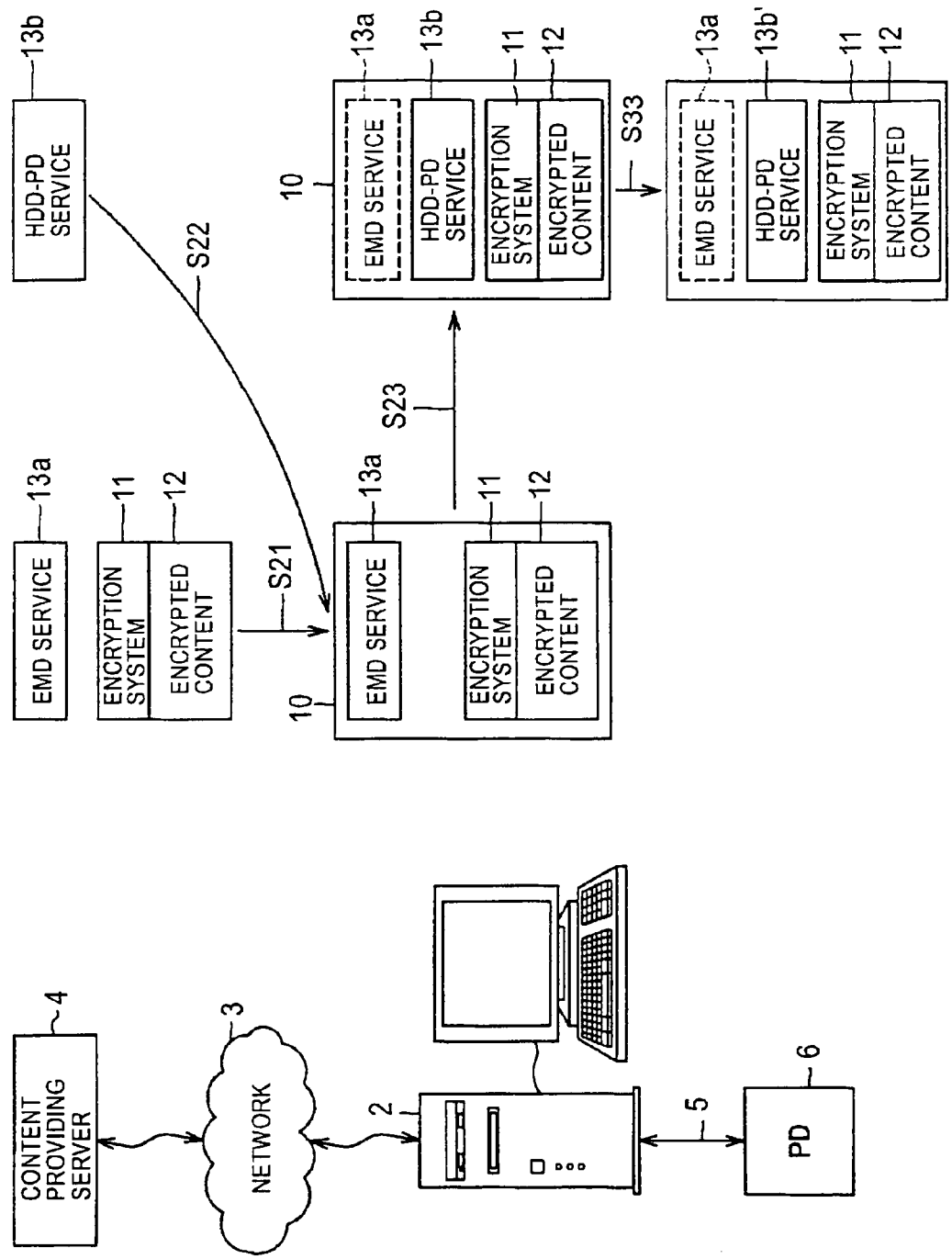

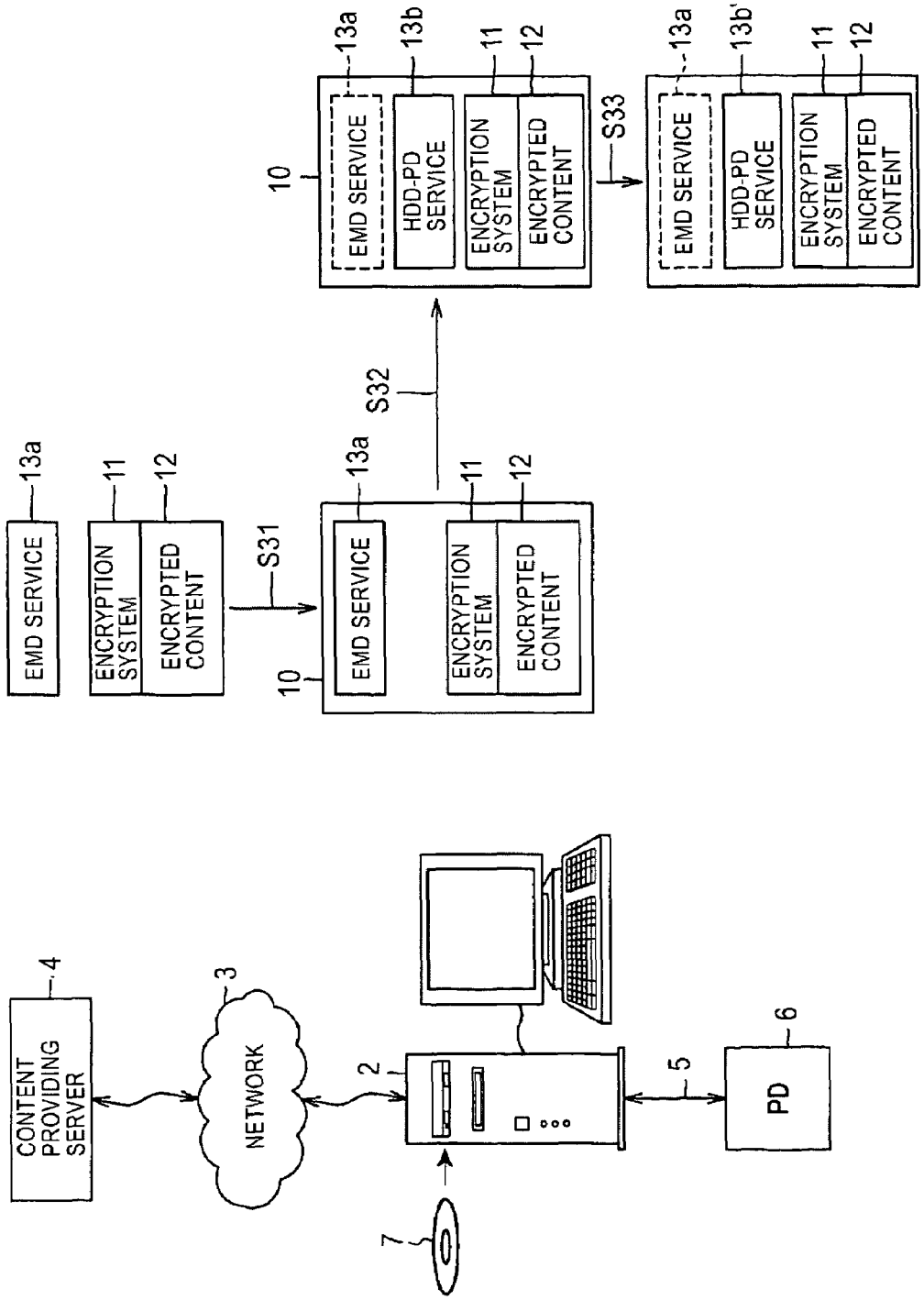

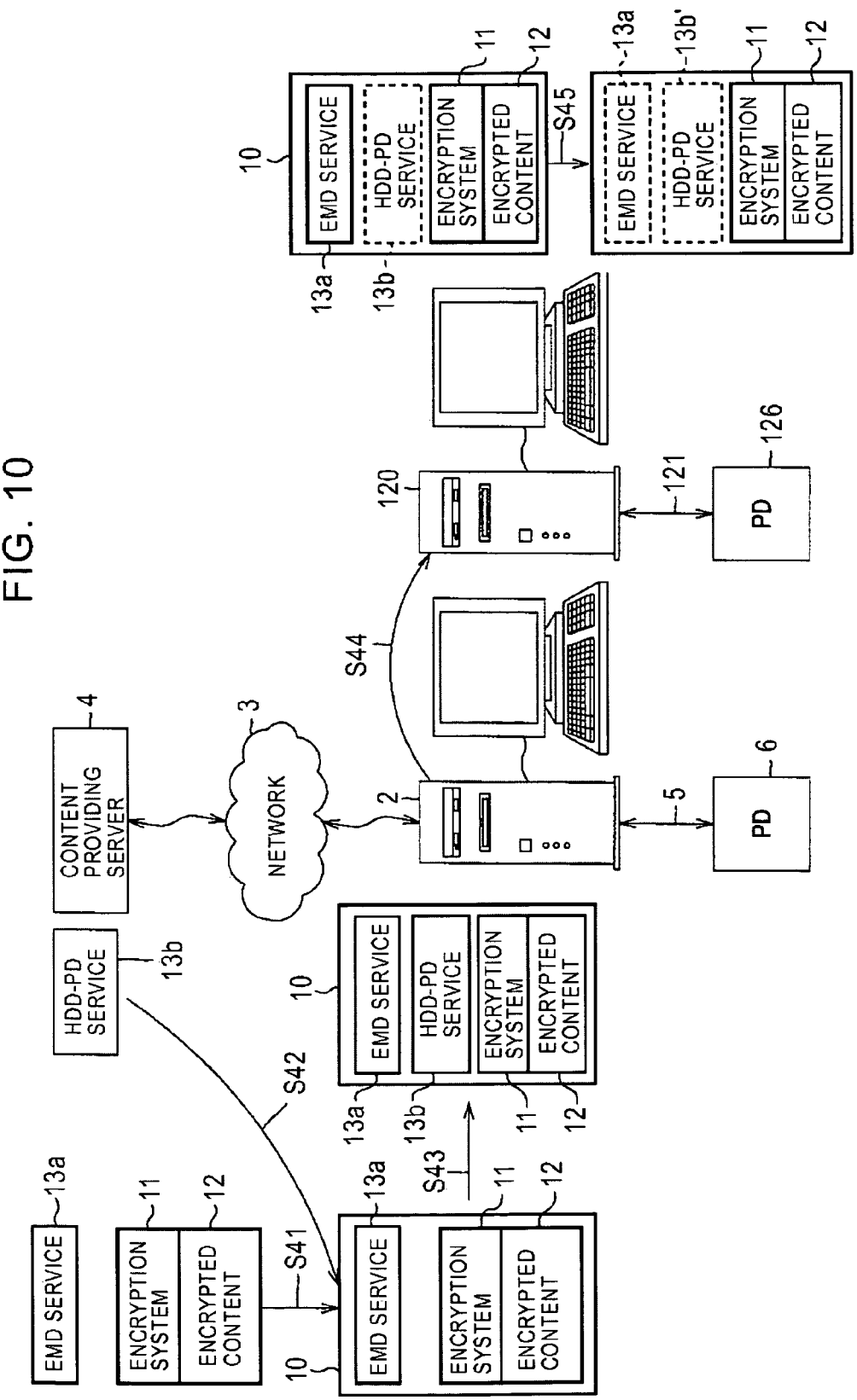

CONTENT-DATA PROCESSING APPARATUS, CONTENT-DATA PROCESSING METHOD, CONTENT DATA MANAGEMENT SYSTEM AND CONTENT DATA MANAGEMENT METHOD

BACKGROUND OF THE INVENTION

1. Field of the Invention

The present invention relates to a content-data processing apparatus and a content-data processing method which in which content data, such as music and/or video data, obtained by downloading or the like from a content providing server through a network is managed and processed in accordance with a use condition description specifying use conditions, such as the playback time-limit of the content data. The present invention further relates to a content-data management system and a content-data management method in which content data is transmitted to the content-data processing apparatus through the network and is received by the content-data processing apparatus, and the content data is managed and played back in accordance with the use condition information.

2. Description of the Related Art

In recent years, online distribution of music and/or video content using networks, such as the Internet and cable television networks, has been put to practical use. In such a content distribution system, in order to distribute the content over the network(s), a content provider provides the content on the web. Users of the music distribution system use their own personal computers to access, for example, the web provided by the content distributor to download desired content.

The content distributor needs to manage the copyright of the content. The content distributor, therefore, identifies the users using, for example, their respective IDs (identifiers) and passwords and distributes encrypted content to only authenticated users. In addition, to limit the number of uses, a period in which playback is allowed, and so on and to protect copyrights, the content provider attaches use condition information to music content and distributes the content to the users.

Japanese Unexamined Patent Application Publication No. 2000-359616, assigned to the present assignee, discloses an information processing apparatus that allows the users to decrypt content data based on the use condition information.

However, in such a use condition for the encrypted content, for example, only one description regarding an article, such as a playback period, is provided for one piece of content in one file. That is, with respect to the same music content in one file, use conditions are not available that provide different playback periods for a broadcast-type music distribution service, in which music data is distributed to clients, and for a media-bind-type service, in which music data read from CDs (compact discs) or the like is stored on the internal or external HDDs of the clients so that the content is played back from the HDDs. That is, the same music content in one file cannot be used in different services.

When a use condition is described in separate files in different formats for respective services, the same music content can be played back. This content encryption scheme, however, is determined by only the file format.

SUMMARY OF THE INVENTION

The present invention has been made in view of the foregoing situation, and an object of the present invention is to provide a content-data processing apparatus and a content-data processing method which allow the same content in one file to be used in different services.

Another object of the present invention is to provide a content-data processing apparatus and a content-data processing method which allow multiple use conditions that are different for respective services to be described in the format of one file.

Another object of the present invention is to provide a content-data processing apparatus and a content-data processing method which allow use conditions that are different for respective services to be additionally described in the format of one file.

Still another object of the present invention is to provide a content-data processing apparatus and a content-data processing method which allow the handling of encryption keys for respective services to be made dependent upon each service, the services having different encrypted contents stored in one file.

Further object of the present invention is to provide a content-data processing apparatus and a content-data processing method which allow a service to be added without a change in the file format.

Further object of the present invention is to provide a content-data processing apparatus and a content-data processing method which allow the same content in one file to be used in different services so that the content data is played back.

To achieve the foregoing objects, the present invention provides a content-data processing apparatus. The content-data processing apparatus processes content data, received through a network and/or from a storage medium, in accordance with a use condition description corresponding to a type of service. The content-data processing apparatus includes a data processing unit for processing the content data by using a file for encrypting content and storing the encrypted content, a key that encrypted the content, and use condition descriptions for respective services in which the content is used.

In the content-data processing apparatus, the data processing unit processes the content data by using a file for encrypting content and storing the encrypted content, a key that encrypted the content, and use condition descriptions for respective services in which the content is used.

To achieve the foregoing objects, the present invention provides a content-data processing method. The content-data processing method is executed by a content-data processing apparatus to process content data, received through a network and/or from a storage medium, in accordance with a use condition description corresponding to a type of service. The content-data processing method includes a data processing step of processing the content data by using a file for encrypting content and storing the encrypted content, a key that encrypted the content, and use condition descriptions for respective services in which the content is used. The data processing step includes a step of obtaining information regarding the use condition description for each service from the file, a step of checking the use condition description for the service from the information regarding the use condition description, a step of determining the content encryption key from the use condition description for the service, and a step of decrypting the encrypted content by using the encryption key.

In the content-data processing method, in the data processing step, information regarding the use condition description for each service is obtained from the file, the use condition description for the service is checked from the information regarding the use condition description, the content encryption key is determined from the use condition description for the service, and the encryption key is used to decrypt the encrypted content.

To achieve the foregoing objects, the present invention provides a content-data management system. The content-data management system includes a content-data processing apparatus and a providing server. The content-data processing apparatus processes content data, received through a network and/or from a storage medium, in accordance with a use condition description corresponding to a type of service. The providing server supplies content data to the content-data processing apparatus through the network. The content-data processing apparatus includes a data processing unit for processing the content data by using a file for encrypting content and storing the encrypted content, a key that encrypted the content, and use condition descriptions for respective services in which the content is used.

The data processing unit in the content-data processing apparatus processes the content data by using a file for encrypting content and storing the encrypted content, a key that encrypted the content, and use condition descriptions for respective services in which the content is used.

To achieve the foregoing objects, the present invention provides a content-data management method executed by a content-data management system. The content-data management system includes a content-data processing apparatus for processing content data, received through a network and/or from a storage medium, in accordance with a use condition description corresponding to a type of service and a providing server for supplying content data to the content-data processing apparatus through the network. The content-data management method includes a data processing step of processing the content data by using a file for encrypting content and storing the encrypted content, a key that encrypted the content, and use condition descriptions for respective services in which the content is used. The data processing step includes a step of obtaining information regarding the use condition description for each service from the file, a step of checking the use condition description for the service from the information regarding the use condition description, a step of determining the content encryption key from the use condition description for the service, and a step of decrypting the encrypted content by using the content encryption key.

In the data processing step, information regarding the use condition description for each service is obtained from the file, the use condition description for the service is checked from the information regarding the use condition description for each service, the content encryption key is determined from the use condition description for the service, and the content encryption key is used to decrypt the encrypted content.

According to the content-data processing apparatus of the present invention, the content data is processed by using a file for encrypting content and storing the encrypted content, a key that encrypted the content, and use condition descriptions for respective services in which the content is used. Thus, this arrangement allows the same content in one file to be used through different services. Further, this arrangement allows multiple use conditions that are different from each other for respective services to be described in the format of one file. Further, this arrangement allows multiple use conditions that are different from each other for respective services to be added to and described in the format of one file. This arrangement also allows the handlings of encryption keys for respective services having different encrypted contents to be made dependent upon the respective services. This arrangement also allows a service to be added without a change in the file format.

According to the content-data processing method of the present invention, in the data processing step, information regarding the use condition description for each service is obtained from the file, the use condition description for the service is checked from the information regarding the use condition description, the content encryption key is determined from the use condition description for the service, and the encryption key is used to decrypt the encrypted content. Thus, this arrangement allows the same content in one file to be used through different services. Further, this arrangement allows multiple use conditions that are different from each other for respective services to be described in the format of one file. Further, this arrangement allows multiple use conditions that are different from each other for respective services to be added to and described in the format of one file. This arrangement also allows the handlings of encryption keys for respective services having different encrypted contents to be made dependent upon the respective services. This arrangement also allows a service to be added without a change in the file format.

According to the content-data management system of the present invention, the data processing unit in the content-data processing apparatus processes the content data by using a file for encrypting content and storing the encrypted content, a key that encrypted the content, and use condition descriptions for respective services in which the content is used. Thus, this arrangement allows the same content in one file to be used through different services and the content data to be played back.

According to the content-data management method of the present invention, in the data processing step, the content data is processed by using a file for encrypting content and storing the encrypted content, a key that encrypted the content, and use condition descriptions for respective services in which the content is used. Thus, this arrangement allows the same content in one file to be used through different services and the content data to be played back.

BRIEF DESCRIPTION OF THE DRAWINGS

FIG. 8 illustrates a first specific example of operation of the music-content management system;

FIG. 9 illustrates a second specific example of operation of the music-content management system; and FIG. 10 illustrates a third specific example of operation of the music-content management system.

DESCRIPTION OF THE PREFERRED EMBODIMENT

A music-content management system according to a most preferred embodiment of the present invention will be described below with reference to the accompanying drawings. In the music-content management system, music content is downloaded from a content server of a music distributor to a client of a music user through a network, and for example, the downloaded music content or music content read from medium, such as a CD, are managed.

Figure 1:
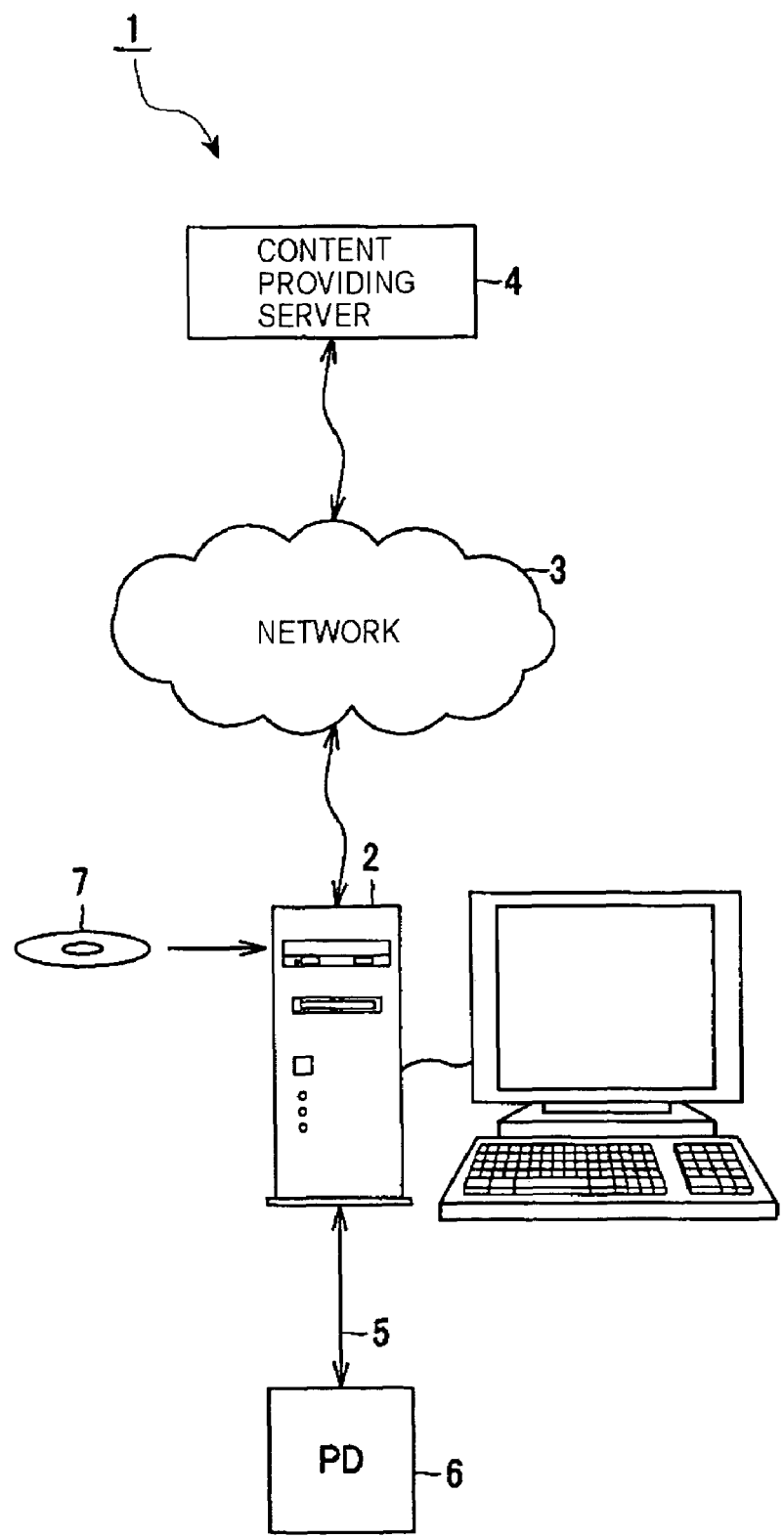
FIG. 1 is a schematic view of an entire music-content management system according to an embodiment of the present invention.

FIG. 1 is a schematic view showing the entire configuration of a music-content management system 1 according to the present invention. The music-content management system 1 may include a client 2 such as a personal computer, a network 3 such as the Internet and/or a local area network, and a content providing server 4 that distributes music data (hereinafter referred to as "content"). The content providing server 4 may include a content server that distributes stored content in response to a request from the client 2, a license server that stores use conditions and so on which are described below, and a billing server.

A portable device (PD) 6, which serves as portable music playback equipment, is connected to the client 2 via a USB (universal serial bus) cable 5. The portable device 6 has an internal storage medium, such as a memory card, a magneto-optical disk, or a hard disk (HD). Content that is transferred from the client 2 in accordance with use conditions described below is stored in the storage medium and is played back.

The client 2 executes a broadcast-type music distribution service and a media-bind-type service. The media-bind-type service involves storing music data (i.e., content) on a HDD (hard disk drive) that is provided internally or externally to the client 2, transferring the content from the HDD to the portable device (PD) 6, copying the content, and playing back the content.

Specific examples of the broadcast-type music distribution service include an EMD (electrical music distribution) service. The client 2 downloads content, compressed by a predetermined compression system, from the content providing server 4 for an EMD service. The client 2 then encrypts the content by a predetermined encryption system and records the resulting content to, for example, the internal or external HDD. In this case, the content server of the content providing server 4 distributes the content and also the license server thereof distributes the EMD-service use-condition information indicating content use conditions.

The client 2 processes the music content and the use-condition information in a state in which they are in a file, as described below. An encryption scheme is described in the format of the file. Thus, the client 2 can add a use condition for each service.

Specific examples of the media-bind service include a HDD-PD (portable device) service that compresses content, downloaded through the EMD service or read from a medium such as a CD (compact disc), by a predetermined compression system; encrypting the compressed content by a predetermined encryption system; recording the encrypted content to the HDD; and further transferring or copying the content from the HDD to the portable device 6 for playback.

When recording content, downloaded through the EMD service or read from a medium such as a CD, to the HDD, the client 2 generates use condition information, stores the use-condition information in a file together with the content, and records the file to the HDD, in accordance with a playback condition of the content. Upon transferring or copying the content from the HDD to the portable device 6, the portable device 6 changes or updates the use condition information in the file and records the use condition information, together with the content, to the storage medium in the portable device 6.

In the EMD service, content downloaded from the content providing server 4 is also stored on the HDD provided internally or externally to the client 2. Herein, in order to distinguish the two services, a service in which content is recorded to the HDD and the recorded content is transferred or copied to the portable device 2 is referred to as a "HDD-PD service" so as to be distinguished from the EMD service in which content is downloaded from the content server.

As the compression system, an ATRAC 3 (Adaptive TRansform Acoustic Coding 3 (registered trademark)) system, an MP3 (MPEG Audio Layer 3) system or the like is used for the services. As the encryption system, a DES (data encryption standard) system or the like is used.

Even when the client 2 transfers encrypted content recorded on the HDD to the portable device 6 via the USB cable 5 in accordance with the use condition information for the EMD service, the use condition information may be updated in response to the transfer. The processing of transferring content stored on a HDD to a portable device will herein be referred to as "check-out". A use condition regarding the check-out is also described in the above-noted use condition information. When the client 2 checks out content, the number of available check-outs is reduced by one. When the number of available check-outs is zero, corresponding content cannot be checked out. Naturally, depending on a service, the number of available check-outs is pre-set to zero to disable the recording of content to the portable device 6. For example, in the HDD-PD service, the number of check-outs to the portable device 6 is pre-set so as to permit check-out, but in the EMD service, check-out from the client 2 to the portable device 6 may be prohibited.

Depending on use condition information for the EMD service or use condition information for the HDD-PD service, the client 2 deletes (or disables the use of) content stored on the portable device 6 via the USB cable 5 and updates the use condition information in response to that operation. Such delete processing will herein be referred to as "check-in". Upon check-in, the number of available check-outs which is recorded on the client 2 is increased by one.

The client 2, however, cannot check in content that another client has checked out to his/her portable device 6. That is, the client 2 can check in only content that the client 2 itself checked out.

Figure 2:
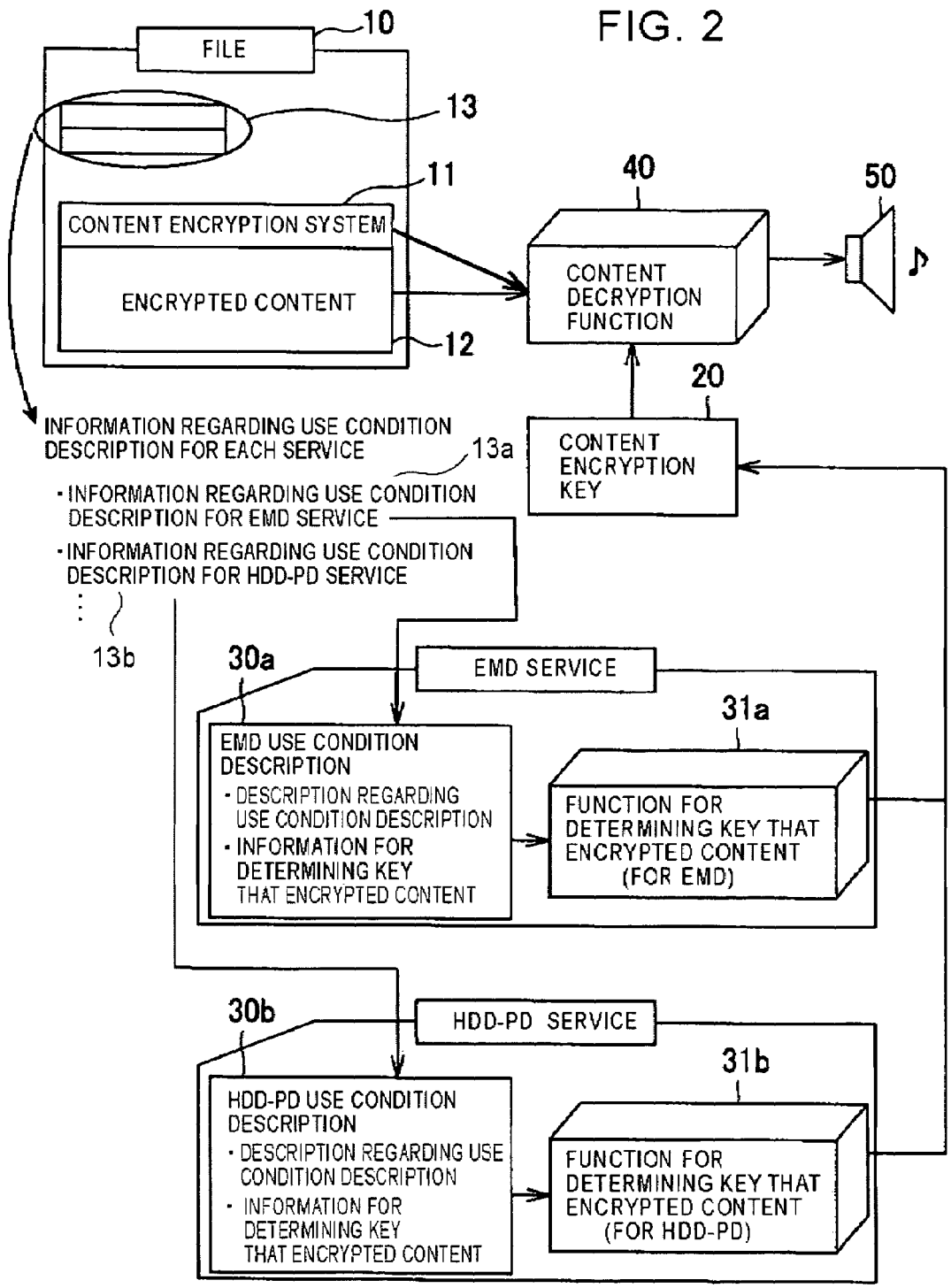
FIG. 2 is schematic diagram illustrating the configuration of a file handled by a client and illustrating processing for encryption.

In the music-content management system 1, the client 2 processes content by using three types of data as shown in FIG. 2, i.e., a file 10 for encrypting content and storing the content, a key 20 that encrypted the content, and a use condition description 30 for each service in which the content is used. A CPU (central processing unit) 61 (shown in FIG. 6) in a hardware configuration described below processes the three types of data. The CPU 61 functions as a data processor, and processes the content by using the three types of data, i.e., the file 10, the key 20 that encrypted the content, and the use condition description 30 for each service in which the content is used.

The file 10 stores one type of content encryption system 11 and one type of encrypted content 12. The file 10 also stores information 13 regarding use condition descriptions for the respective services. In the present embodiment, the client 2 executes two types of services, namely, the EMD service and the HDD-PD service. Thus, the information 13 includes information 13a regarding a use condition description for the EMD service and information 13b regarding a use condition description for the HDD-PD service. Naturally, the file 10 may include other services. The use condition description information 13b for the HDD-PD service is information that has been added by the client 2 later. Since the encryption scheme is described in the file format, a use condition for each service can be easily added.

The key 20 that encrypted the content is also a key for decrypting the encrypted content 12 in the file 10 by using the encryption system 11. The handling of the content encryption key can be made dependent upon each service. The use condition description for each service, in which the content is used, includes content use conditions, such as a playback time-limit, and information for determining the key 20 that encrypted the content.

As the content use conditions, device and media categories for check-out, a check-out maximum count, device and media categories for copy, and a copy maximum count may be described. An ATRAC-3 CD burn maximum count (i.e., the maximum count of copies to a CD in an ATRAC-3 encryption system) may also be described. Further, start time (i.e., absolute start time), end time (i.e., absolute end time), and a period time (i.e., a relative time) are also described in order to indicate the playback time-limit.

The device and media categories for check-out are described for specifying a device that can check out content from a client. As described above, the check-out refers to transferring content from a client to a portable equipment or device (PD). For example, three categories can be defined, including a net-connectable mini-disc record/playback device that can connect to the Internet to record music data, portable equipment having a timer function with a clock, and portable equipment without a clock. When flag "1" indicates a PD that can check out, i.e., transfer, the content from a client, "110" represents the net-connectable mini-disc record/playback device and the portable equipment having a timer function. "110" also signifies that the portable equipment without a clock cannot check out the content. Returning checked-out content from a PD to an original client is called check-in, as described above. After returning content, once checked out from a client to a PD, to the client by check-in, it is also possible to re-check out the returned content.

The check-out maximum count is information specifying the maximum number of checkouts available for portable equipment that is permitted to check out content.

The device and media categories for copy are described to specify equipment that can copy content from a client. Copy refers to copying content from a client to a portable equipment or device (PD). Thus, the device and media categories indicate portable equipment that can copy content from a client. In the same manner as described for the "device and media categories for check out", three categories can be defined, including a net-connectable mini-disc record/playback device, portable equipment having a timer function with a clock, and portable equipment without a clock. When flag "1" indicates a PD that can copy the content from a client, "110" represents the net-connectable mini-disc record/playback device and the portable equipment having a timer function. "110" also signifies that the portable equipment without a clock is prohibited to copy the content.

The copy maximum count is information specifying the maximum number of copies available for portable equipment that is permitted to check out content by the "device and media categories for copy".

The ATRAC-3 CD burn maximum count is information specifying the maximum number of copies of content to a CD in an ATRAC-3 codec system.

Start time (i.e., absolute start time) indicates the absolute date and time when the content becomes available and end time (i.e., absolute end time) indicates the absolute date and time when the content becomes unavailable. Thus, the start time and the end time specify an absolute period in which the content is available. A period-time (a relative time) is information indicating how long the content is available from certain date and time.

In the example shown in FIG. 2, the file 10 stores the use condition description information 13a for the EMD service. The client 2 searches for an EMD use condition description 30a from the use condition description 13a for the EMD service. In the EMD use condition description 30a, for example, a description regarding a use condition description about a playback time-limit and information for determining a key that encrypted the content are written. The information for determining the key that encrypted the content is substituted into a function (for EMD) 31a for determining the key that encrypted the content, to thereby produce the content encryption key 20.

The file 10 also stores information regarding the use condition description 13b for the HDD-PD service. The client 2 searches for an HDD-PD use condition description 30b from the use condition description 13b for the HDD-PD service. In the HDD-PD use condition description 30b, for example, a description regarding a use condition description about a playback time-limit and information for determining a key that encrypted content are written. The information for determining the key that encrypted the content is substituted into a function (for HDD-PD) 31b for determining the key that encrypted the content, to produce the content encryption key 20.

While the use condition description can be set for each service, as described above, the content encryption key 20 that can be obtained from the use condition description is always constant. Further, only the descriptions about the available services are written in the file 10, and close relationships among the encrypted content, the encryption system, and the services are not written. Also, increasing the amount of information, in the file 10, regarding the use condition descriptions for individual services allows the file 10 to be used for a variety of services. In the present invention, a service can be added without a change in the file format.

Figure 3:
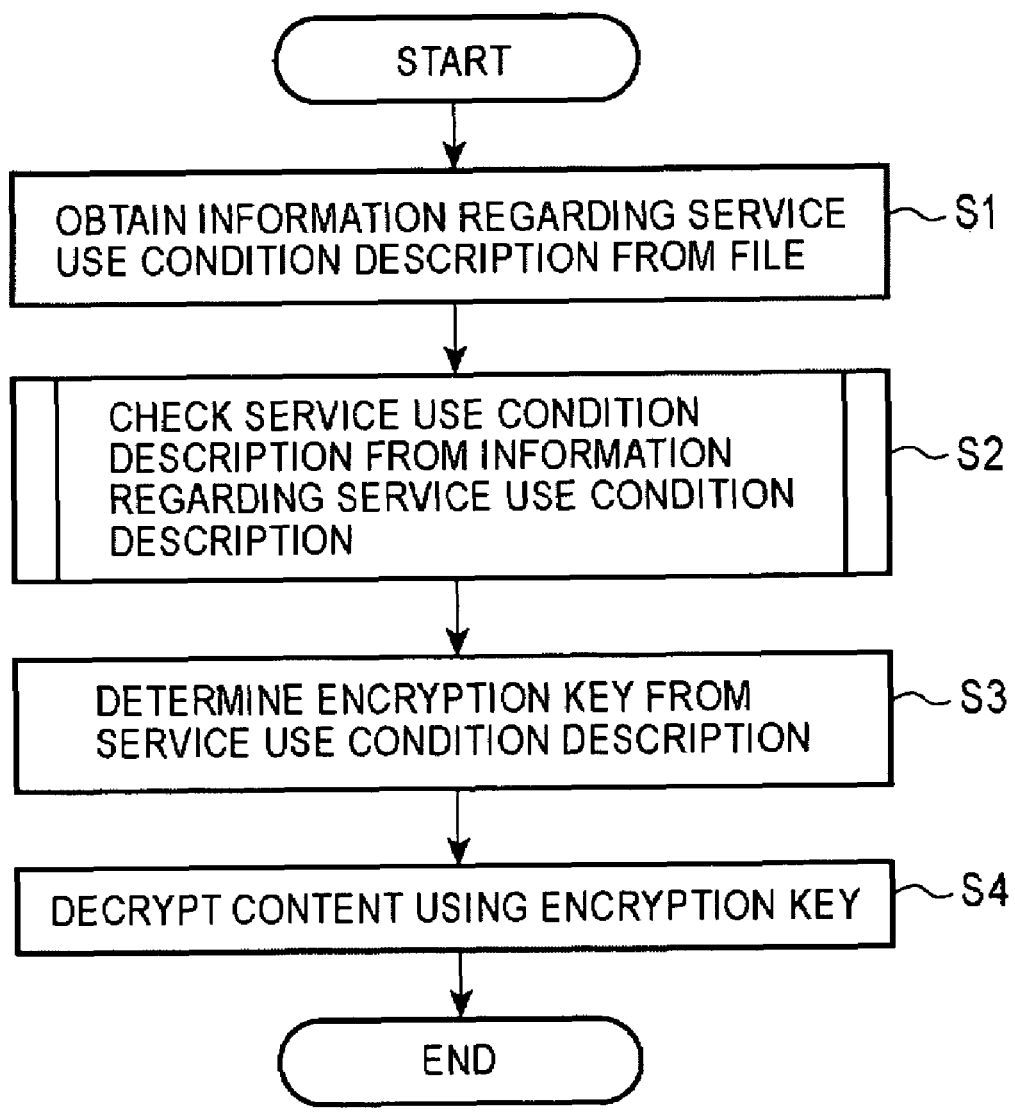
FIG. 3 is a flow chart showing processes for the client to use content.

FIG. 3 shows processes when content is used at the client 2. The client 2 searches the file 10 for the use condition description information 13 for the service and obtains the information 13 (in step S1). The client 2 searches for the use condition description 30 from the information 13 and checks the description 30 (in step S2). The client obtains information for determining the encryption key 20, which information is found in the use condition description 30, and substitutes the information into a function 31 (i.e., the function 31a for the EMD service or a function 31b for the HDD-PD service) for determining the content encryption key 20 (in step S3). A content decryption unit 40 in the client 2 decrypts the encrypted content 12 in the file 10 by using the encryption key 20 (in step S4). The content decryption unit 40 is a block that functions when the CPU 61 (shown in FIG. 6 and described below) executes a corresponding process in a content processing method according to the present invention. As a result of the decryption, the content decryption unit 40 provides an audio signal, which is then output via, for example, a speaker 50 or a headphone (not shown).

Figure 4:
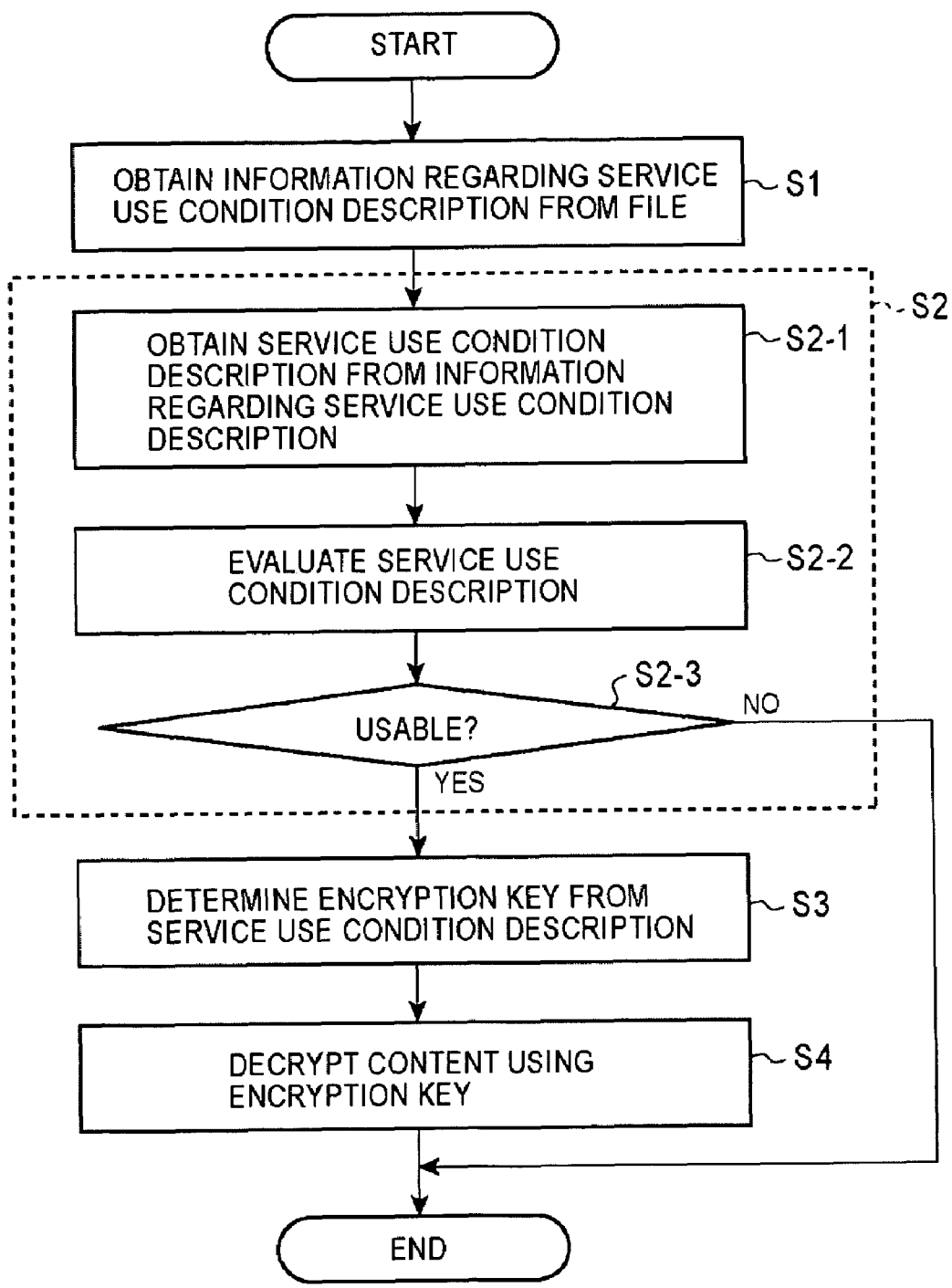
FIG. 4 is a flow chart showing detailed processes in a flow from checking a service use condition description to processing for determining an encryption key.

FIG. 4 shows details of the flow from the process in which the service use condition description 30 is checked in step S2 shown in FIG. 3 to the process in which the encryption key 20 is determined in step S3. Referring to FIG. 4, in step S2-1, the client 2 obtains the service use condition description 30 from the information regarding the service use condition description 13. In step S2-2, the client 2 evaluates the service use condition description 30. In step S2-3, the client determines whether or not the service is usable. When it is determined in step S2-3 that the service is usable, the process proceeds to step S3.

Now, a description is given below of an example in which the client 2 uses the file 10 (shown in FIG. 2) in the EMD service. First, the client 2 obtains the use condition description information 13a regarding the EMD service from the file 10 (in step S1). The client 2 then obtains the use condition description 30a from the EMD service (in step S2-1). The client 2 evaluates the use condition description 30a for the EMD service (in step S2-2). When it is determined that the service is usable (i.e., "Yes" in step S2-3), the client 2 retrieves information for determining the content encryption key 20 from the use condition information description 30a for the EMD service and substitutes the retrieved information into the function (for EMD service) 31a for determining the content encryption key, to thereby determine the content encryption key 20 (in step S3). In this case, a portion for obtaining the use condition description 30 and a portion for determining the content encryption key 20 can be determined by the EMD service independently. Naturally, they can also be determined by the HDD-PD service independently.

In the client 2, the content decryption unit 40, whose functions are implemented by the CPU 61 (shown in FIG. 6 and described below), puts the content encryption key 20 into the content encryption function to decrypt the content and outputs the decrypted content via, for example, the speaker 50 or the headphone, as described above.

As described above, in the music-content management system 1, since the encryption scheme is described in the file format handled by the client 2, a use condition for each service can be added. The handling of the content encryption key can also be made dependent upon each service. This arrangement also allows a service to be added without a change in the file format.

The EMD use condition description, which is a broadcast-type description, may contain the verification of the integrity of the description. In the HDD use condition description which is a media-bind-type description, the integrity of the description is associated with information on the HDD. For example, a method for using the identification code (ID) of the HDD is available.

Figure 5:
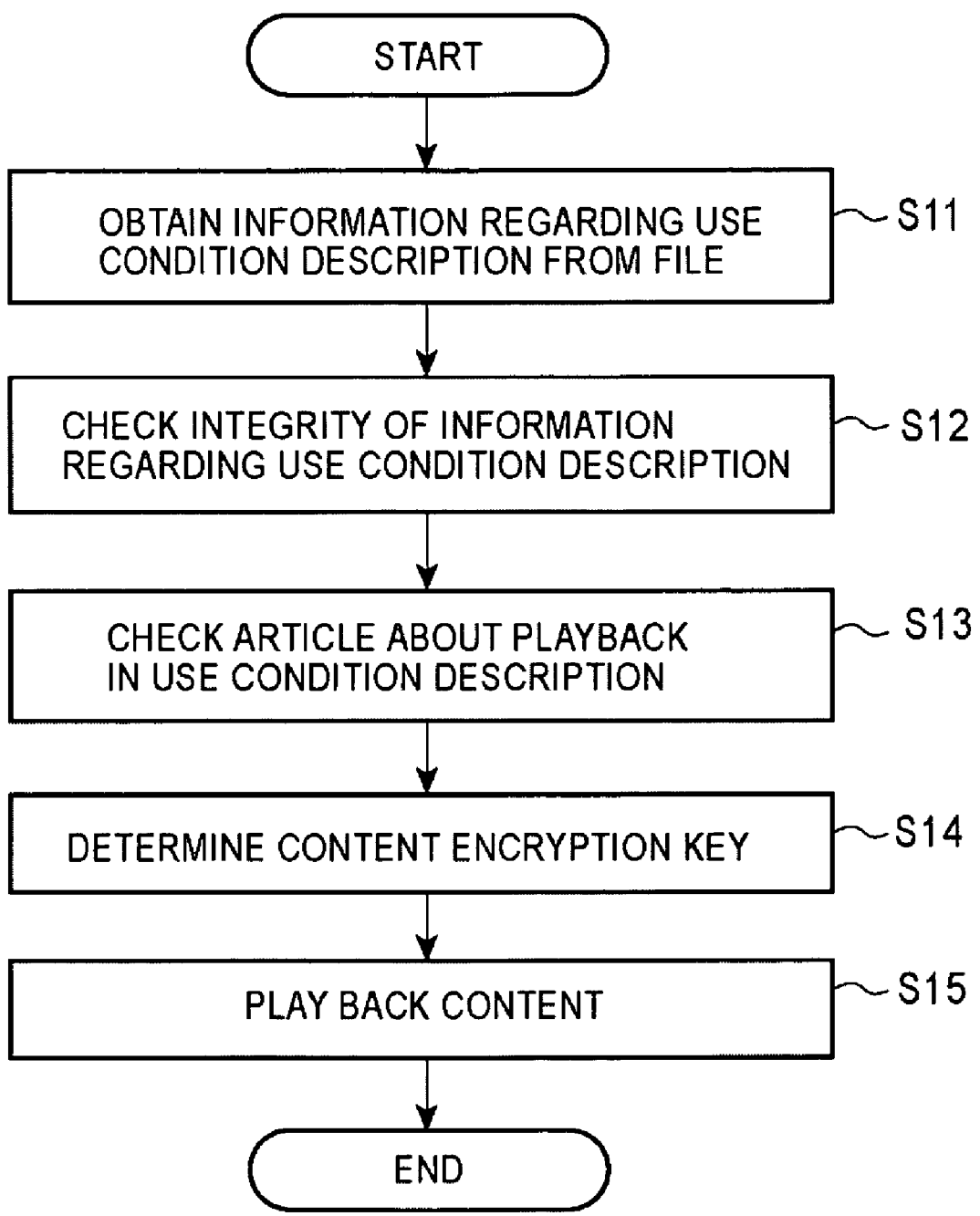
FIG. 5 is a flow chart showing processes from checking the integrity of the description to playing back content when the client uses the content.

FIG. 5 shows processes from checking the integrity of the description to playing back of content. First, information regarding a use condition description for a desired service is obtained from the file (in step S11). The integrity of the use condition description information is checked (in step S12). For the EMD service, since the verification of the integrity of the description is provided in the description, the guarantee is used. For the HDD service, since the integrity of the description is associated with, for example, the HDD-ID, the HDD-ID is used. After the integrity is verified, an article about the playback in the use condition description is checked (in step S13). Next, the content encryption key is determined as in step S3 described above (in step S14). The encryption key is used to decode and play back the content (in step S15).

Now, an example in which the content is previewed in the EMD service will be considered. In this case, the playback time-limit in the use conditions is specified to be one week and thus the user cannot listen to the music after one week. However, when the user purchases the right to the content so that the playback with the HDD is enabled, he or she can continue using the content even after one week. Thus, the data contains two types of information regarding the use condition description. The HDD use conditions are generated and added to the file by the client.

When played back with the HDD, the playback is possible using information regarding a HDD use condition. The playback is also possible through the EMD service. The content, however, cannot be played back with a HDD that is different from the above-mentioned HDD, since the integrity of information regarding the HDD use condition description is not guaranteed. On the other hand, with respect to information regarding an EMD use condition description, the integrity thereof is verified by itself. Thus, the use of the condition (i.e., one-week playback time-limit) can be used to play back the content on another HDD. Specific examples of the operations thereof will be described later in detail.

Figure 6:
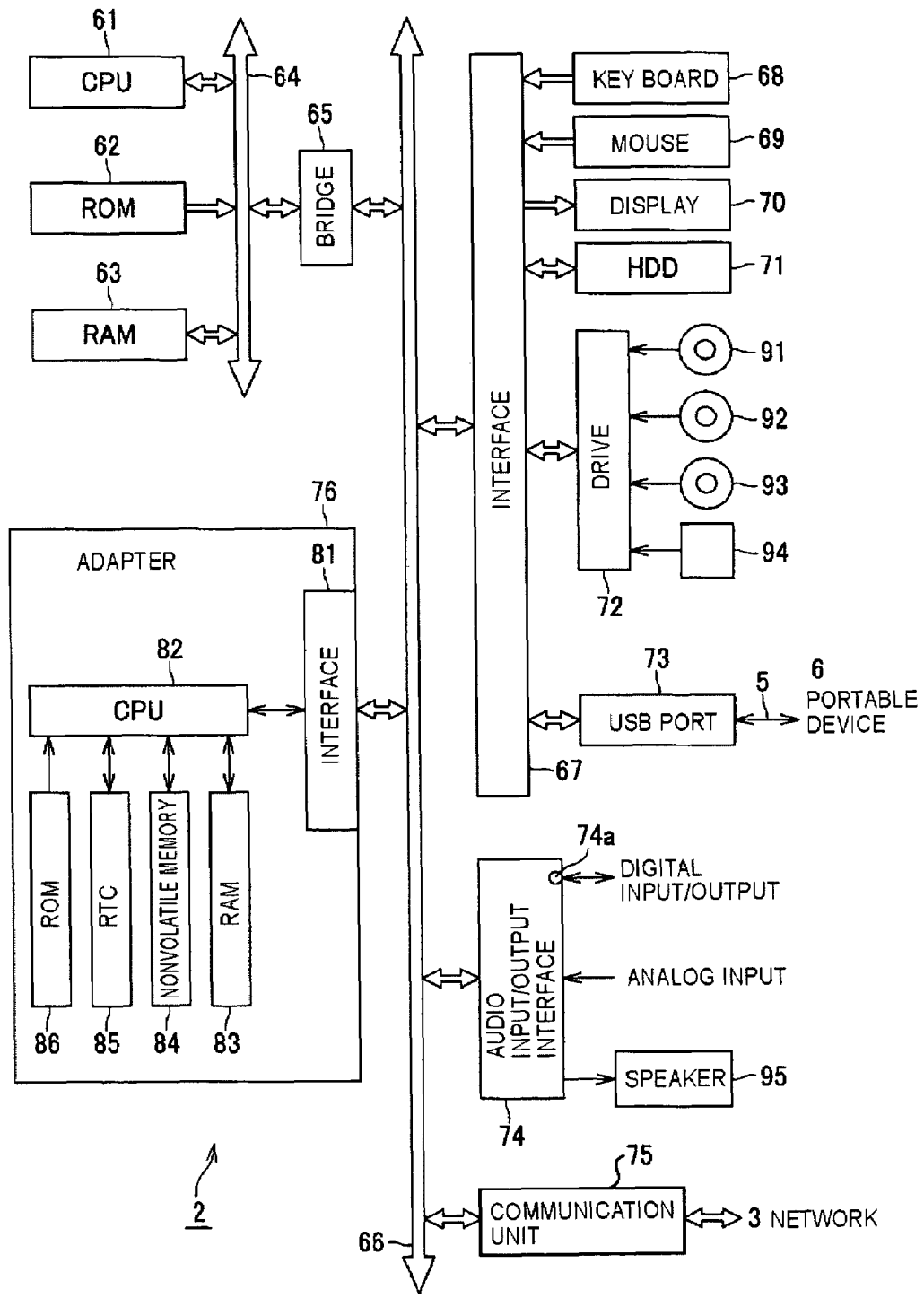
FIG. 6 is a block diagram showing the hardware configuration of the client.

The hardware configurations of individual elements that constitute the music-content management system 1 are described next. First, the client 2 has a configuration as shown in FIG. 6.

The CPU (central processing unit) 61 actually executes various application programs (details of which are described below) and an OS (operating system). Typically, a ROM (read-only memory) 62 stores programs for use by the CPU 61 and stores, basically, constant data of parameters for computational operations. A RAM (random access memory) 63 stores a program used for execution of the CPU 61 and parameters that appropriately change upon the execution. The CPU 61, the ROM 62, and the RAM 63 are interconnected via a host bus 64, which includes a CPU bus and so on.

The host bus 64 is connected to an external bus 66, such as a PCI (peripheral component interconnect/interface) bus, via a bridge 65.

A keyboard 68 is used by a user when he or she enters various types of instructions to the CPU 61. A mouse 69 is operated by the user when he or she specifies and selects a point on the screen of a display 70. The display 70 is implemented by an LCD (liquid crystal display) device or a CRT (cathode ray tube) display device to display various types of information in a text or image form. A HDD (hard disk drive) 71 drives a hard disk to record or play back a program and information processed by the CPU 61.

A drive 72 reads data or a program recorded in a magnetic disk 91, an optical disk 92 (including a CD), a magneto-optical disk 93, or a semiconductor memory 94, which is loaded, and supplies the data or program to the RAM 63, which is connected to the drive 72 via the host bus 64, the bridge 65, the external bus 66, and an interface 67.

The portable device 6 is connected to a USB port 73 via the USB cable 5. The USB port 73 outputs, to the portable device 6, data (including content, commands from the portable device 6, and so on) that is supplied from the HDD 71, the CPU 61, or the RAM 63 via the host bus 64, the bridge 65, the external bus 66, and the interface 67.

An audio input/output interface 74 has an IEC (International Electrotechnical Commission) 60958 terminal 74a and executes interface processing, such as digital-audio input-output processing or analog-audio input/output processing. A speaker 95 outputs predetermined sound corresponding to content, in accordance with an audio signal supplied from the audio input/output interface 74.

The keyboard 68, the mouse 69, the display 70, the HDD 71, the drive 72, and the USB port 73 are connected to the interface 67, which is, in turn, connected to the CPU 61 via the external bus 66, the bridge 65, and the host bus 64.

A communication unit 75 is connected to the network 3. The communication unit 75 encloses data (such as a registration request or a content transmission request), supplied from the CPU 61 or the HDD 71, in packets in a predetermined format and transmits the packets through the network 3. The communication unit 75 also outputs data (such as an authentication key or content), contained in received packets, to the CPU 61, the RAM 63, or the HDD 71 through the network 3.

An adapter 76 is integrally formed as a semiconductor IC and is connected to the client 2. The adapter 76 includes a CPU 82, a RAM 83, a nonvolatile memory 84, a real-time clock (RTC), and a ROM. The CPU 82 cooperates with the CPU 61 in the client 2 via the external bus 66, the bridge 65, and the host bus 64 to execute various types of processing. The RAM 83 stores data and a program needed for the CPU 82 to execute various types of processing. The nonvolatile memory 84 stores data that needs to be retained after the client 2 is powered off. The ROM 86 stores a program for decrypting an encrypted program transferred from the client 2. The RTC 85 performs a clocking operation to provide time information. The semiconductor IC is designed so as to have a secure structure and has high resistance to external malicious access. The function of the semiconductor IC may also be implemented by a software program.

The communication unit 75 and the adapter 76 are connected to the CPU 61 via the external bus 66, the bridge 65, and the host bus 64.

While not shown, the content providing server 4 is also implemented by a computer having an essentially the same configuration as the client 2 shown in FIG. 6. In the description below, therefore, as well as the content providing server 4, the configuration shown in FIG. 6 is applied to the configuration of a content server, a license server, and a billing server which constitute the content providing server 4.

Figure 7:
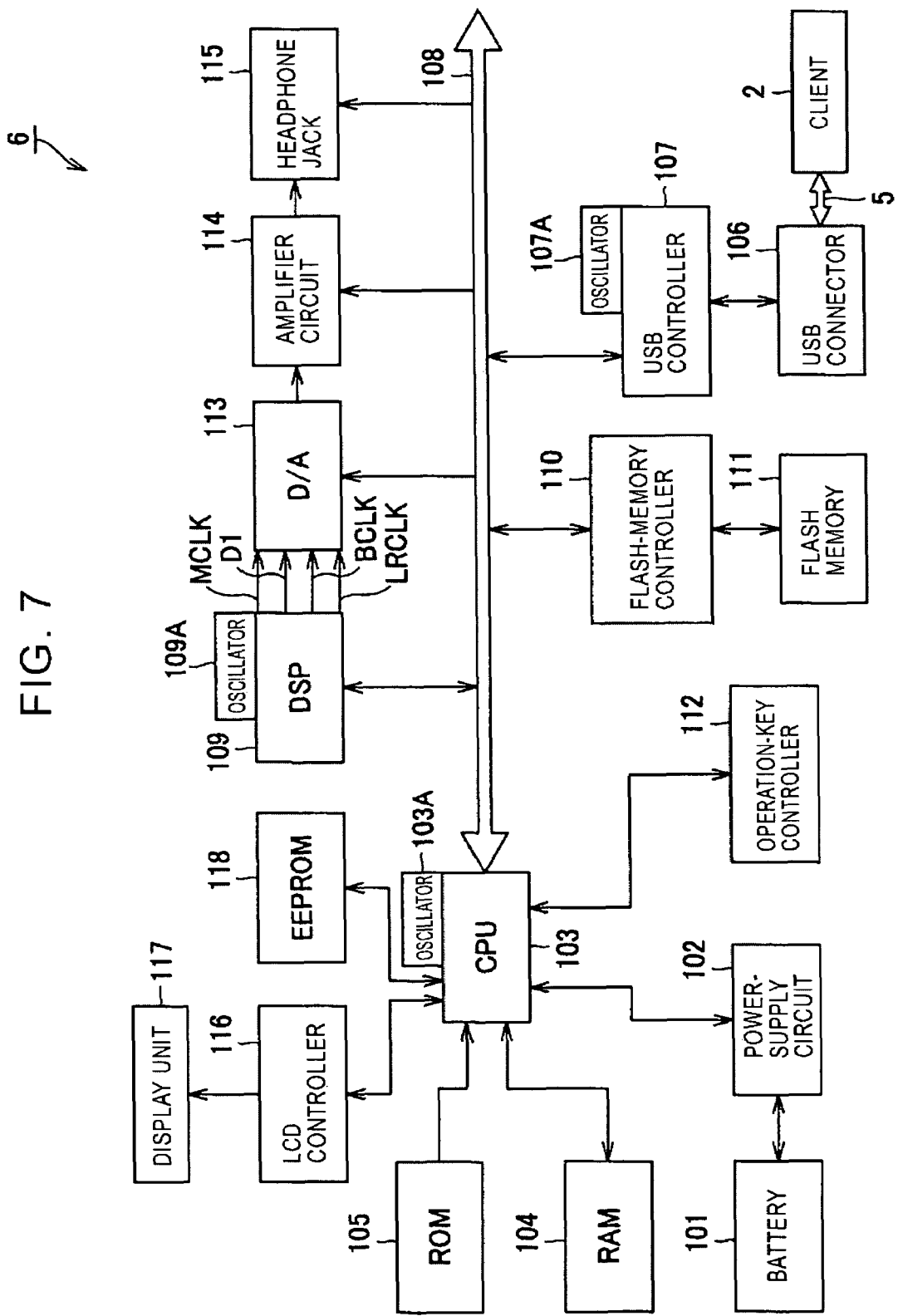
FIG. 7 is a block diagram showing the hardware configuration of the portable device.

The configuration of the portable device 6 will now be described with reference to FIG. 7.

A power-supply circuit 102 converts a power-supply voltage supplied from a battery 101 into internal power having a predetermined voltage. The power-supply circuit 102 then supplies the power to a CPU 103, a RAM 104, a ROM 105, a USB controller 107, a DSP (digital signal processor) 109, a flash-memory controller 110, an operation-key controller 112, an digital-to-analog (D/A) converter circuit 113, an amplifier circuit 114, an LCD controller 116, a display unit 117, and so on to thereby drive the entire portable device 6.

When the USB controller 107 is connected to the client 2 via an USB connector 106 and the USB cable 5, the USB controller 107 supplies data, containing content transferred from the client 2, to the CPU 103 via an internal bus 108.

The data transferred from the client 2 has 64 bytes per packet and has a transfer rate of 12 Mbit/sec.

Data transferred to the portable device 6 contains a header and content. The header contains, for example, a content ID, file name, header size, content key, file size, codec ID, and file information, as well as use condition information needed for playback-restriction processing and so on. The content is encoded and encrypted by an encryption system, such as an ATRAC 3 system.

The header size represents a header data length (e.g., 33 bytes) and the file size represents a content data length (e.g., 33,636,138 bytes).

The content key is a key for decrypting encrypted content. The content key has been encrypted based on a session key (temporal key) generated during mutual authentication processing between the client 2 and the portable device 6 and is transmitted from the client 2 to the portable device 6.

When the portable device 6 is connected to the USB port 73 of the client 2 via the USB cable 5, the portable device 6 and the client 2 perform mutual-authentication processing. The mutual authentication processing is, for example, a challenge-response authentication processing. During the challenge-response authentication processing, the DSP 109 of the portable device 6 performs decryption (decoding) processing.

The challenge-response scheme is a scheme in which, for example, a certain value (challenge) generated by the client 2 is responded by a value (response) generated by the portable device 6 using a secret key shared with the client 2. In the challenge-response mutual authentication processing, the value generated by the client 2 varies every time the authentication is performed. Thus, for example, even if attacked by so called "impersonation" through reading the value output by the portable device 6 and generated with the secret key, the client 2 can detect the unauthorized access, since a different key is used in the next mutual authentication processing.

The content ID is an ID for identification of corresponding content. The codec ID is an ID representing a content codec scheme. For example, codec ID "1" represent the ATRAC-3 and codec ID "0" represents the MP3 (MPEG (Moving Picture Experts Group) Audio Layer-3).

The file name is ASCII (American National Standard Code for Information Interchange) code data into which a content file (described below) corresponding to the content and recorded on the client 2 is converted. The file information is ASCII code data in into which a music title, an artist name, a songwriter's name, a composer's name, or the like corresponding to the content are converted.

When the portable device 6 receives a content writing instruction, together with corresponding content, from the client 2, the CPU 103, which executes a main program read from the RAM 104 or the RAM 105, receives the writing instruction and controls the flash-memory controller 110 to cause the content received from the client 2 to be written to the flash memory 111.

The flash memory 111 has a storage capacity of about 64 Mbytes to store the content. In the flash memory 111, playback code for decompressing content compressed by a predetermined compression system is pre-stored.

The flash memory 111 may be detachably attached, as a memory card, to the portable device 6.

When the user presses a playback/stop button (not show), a corresponding playback instruction is supplied to the CPU 103 via the operation key controller 112. In response, the CPU 103 causes the flash-memory controller 110 to read the playback code and the content from the flash memory 111 and to transfer the code and the content to the DSP 109.

The DSP 109 performs error detection, using a CRC (cyclic redundancy check) system, on the content based on the playback code transferred from the flash memory 111. The DSP 109 then plays back the content and supplies the resulting playback data (indicated by D1 in FIG. 7) to the digital-to-analog converter circuit 113.

The DSP 109 is integrated with an internal oscillation circuit and has an external crystal oscillator 109A. The DSP 109 plays back the content based on a master clock signal MCLK sent from the oscillator 109A. The DSP 109 also supplies, to the digital-to-analog converter circuit 113, the master clock signal MCLK, a predetermined-frequency bit clock signal BCLK generated by the internal oscillation circuit based on the master clock signal MCLK, and an operation clock signal LRCLK. The operation clock signal LRCLK is constituted by an L-channel clock signal LCLK and an R-channel clock signal RCLK for each frame.

When the content is played back, the DSP 109 supplies the above-noted operation clock signal to the digital-to-analog converter circuit 113 in accordance with the playback code. When the content is not played back, the DSP 109 stops supplying the operation clock signal in accordance with the playback code so as to stop the operation of the digital-to-analog converter circuit 113, thereby reducing the total power consumption of the portable device 6.

Similarly, the CPU 103 and the USB controller 107 have crystal oscillators 103A and 107A externally attached thereto, respectively, and execute predetermined processing based on master clock signals MCLK supplied from the respective oscillators 103A and 107A.

With this configuration, the portable device 6 does not require a clock-signal generation module for supplying clock signals to the circuit blocks, such as the CPU 103, the DSP 109, and the USB controller 107. As a result, the circuit configuration can be simplified and miniaturized.

The digital-to-analog converter circuit 113 converts the playback content into an analog audio signal and supplies the audio signal to the amplifier circuit 114. The amplifier circuit 114 amplifies the audio signal and supplies the amplified audio signal to the headphone via a headphone jack 115.

As described above, under the control of the CPU 103, the portable device 6 plays back content stored in the flash memory 111 when the playback/stop button is pressed, and stops the playback of the content when the playback/stop button is pressed during the playback.

When the playback/stop button is pressed after the stop, under the control of the CPU 103, the portable device 6 resumes the content playback at a position at which the previous playback was stopped. When a few seconds elapses without any operation after the playback is stopped as a result of pressing of the playback/stop button, the portable device 6 is automatically powered off so as to reduce the power consumption.

When the playback/stop button is pressed after the portable device 6 is powered off, the portable device 6 does not play back the content at a position at which the previous playback was stopped, but instead plays back the first piece of music.

The CPU 103 in the portable device 6 controls the LCD controller 116 to cause the display unit 117 to display information. Examples of the displayed information include the state of a playback mode (e.g., repeat, playback of an intro, etc.); information of equalizer adjustment (i.e., adjustment of a gain for the frequency band of an audio signal); a music number; playing time; the state of playback, stop, fast forward, fast backward, or the like; a sound volume; and the remaining capacity of the battery 101.

The portable device 6 further stores the so-called FAT (file allocation table) into an EEPROM (Electrically Erasable Programmable ROM) 118. The FAT contains the number of pieces of content written in the flash memory 111, the positions of blocks in which the respective pieces of content are written in the flash memory 111, and other various types of memory storage information.

In the present embodiment, content is processed for each block having 64 Kbyte, and a block position corresponding to each piece of music content is stored in the FAT.

When the FAT is stored in the flash memory 111, for example, a first piece of music content is written to the flash memory 111 under the control of the CPU 103, so that a block position corresponding to the first piece of music content is written to the flash memory 111 as the FAT. Subsequently, a second piece of music content is written to the flash memory 111, so that a block position corresponding to the second piece of music content is written (to the same region as the first piece of music content) in the flash memory 111 as the FAT.

In this manner, the FAT is re-written every time content is written to the flash memory 111. Further, for data protection, the same data is written to the flash memory 111 twice as a reserve.

When the FAT is written to the flash memory 111, the same region in the flash memory 111 is written twice in response to one writing operation. As a result, with a small number of content writing operations, the number of re-writing operations reaches a limit specified for the flash memory 111 to thereby disable the writing to the flash memory 111.

Accordingly, in the portable device 6, the FAT is stored in the EEPROM 118, so that the number of re-writing operations, corresponding to one writing operation, to the flash memory 111 is reduced.

By storing the FAT, which is re-written many times, in the EEPROM 118, the portable device 6 can increase the number of content writable operations by a factor of several tens or more, compared to a case in which the FAT is stored in the flash memory 111. In addition, since the CPU 103 causes the writing such that the FAT is additionally written to available space in the EEPROM 118, the number of re-writing to the same region in the EEPROM 118 is reduced to thereby prevent the EEPROM 118 from becoming un-rewritable in a short period of time.

When the portable device 6 is connected to the client 2 via the USB cable 5 (this connection will hereinafter be called "USB connection"), the portable device 6 recognizes the USB connection, based on an interrupt signal supplied from the USB controller 107 to the CPU 103.

Upon recognizing the USB connection, the portable device 6 receives external power (having a predetermined current) supplied from the client 2 via the cable 5 and, in turn, controls the power-supply circuit 102 to stop the supply of power from the battery 101.

When the USB connection is established, the CPU 103 causes the DSP 109 to stop the playback of content. In this manner, the CPU 103 performs control such that the portable device 6 can constantly receive external power having a predetermined current, by preventing the external power supplied from the client 2 from exceeding the predetermined current.

When the USB connection is established, as described above, the CPU 103 switches power supplied from the battery 101 to power supplied from the client 2 so as to allow the low-cost external power from the client 2 to be used. That is, the consumption of the high-cost power from the battery 101 is reduced, thereby making it possible to extend the life of the battery 101.

Since the CPU 103 causes the DSP 109 to stop playback processing upon receiving external power supplied from the client 2 via the USB cable 5, power loss from the DSP 109 is reduced and, consequently, power loss from the entire system including the client 2 is further reduced.

Some specific examples of the operation of the music-content management system 1 will be described next.

First, a first specific example will be described with reference to FIG. 8. In the first specific example, after demo-music content (i.e., music content for preview) with a playback limit of one week in the EMD service is distributed to the client 2 in, the user can listen to the same music content in the HDD-PD service on a pay-basis for an unlimited playback period.

In this case, the description is given based on the assumption that the content providing server 4 also serves as a registration processing service (i.e., a license server) and a billing server. In response to a demo-music content obtaining request from the client 2, the content providing server 4 transmits an authentication key, needed for mutual authentication with the client 2, to the client 2 and also transmits a program for connection with the content providing server 4.

After the client receives the authentication key and completes the authentication, the client 2 executes the connection program to connect to the content providing server 4. Then, in response to a request from the client 2, the content providing server 4 supplies the demo-music content 12, together with the encryption system 11, to the client 2 (in step S21 in FIG. 8). The content providing server 4 also supplies the use condition description information 13a for the EMD service to the client 2.

The client 2 stores, in the file 10, the encryption system 11, the encrypted content (for preview) 12, and the use condition description information 13a for the EMD service which are sent in step S21 described above.

The demo music content is provided for free of charge or at low cost, and the playback limit thereof is specified to be one week by the use condition description 30a that is searchable from the use condition description information 13a for the EMD service. Thus, the user at the client 2 can play back the demo music content for free of charge or at low cost, but cannot listen to the demo music after one week. The exemplary music content herein is provided for preview, and thus does not meet a request from a user who wishes to listen to the same music content for an unlimited period. Thus, the content provider may put a message on a web site, indicating that the unlimited use of the content is possible upon the purchase of an additional right, or may distribute such a message in the form of a purchase guide together with a corresponding content and encryption system. More specifically, the address (i.e., URL) of a home page (or web site) through which the above-mentioned right can be purchased may be described in a portion where a corresponding music title and the player's name are, rather than in the use condition description. Using the URL, the user can access the web site selling the additional right to purchase the right therethrough. In this example, the additional use-right is corresponds to the HDD-PD service.

For example, the user reads the above-noted purchase guide, and when he or she consents (i.e., gives OK) to a playback-related use condition described in the purchase guide, he or she purchases the right to use the content based on the HDD-PD service (in step S22). Upon the purchase of the content use-right in step S22, the client 2 adds the use condition description information 13b for the HDD-PD service, which information the client 2 has downloaded from the content provider, to the own existing file 10. Since the encryption scheme is described in the file format, multiple pieces of use condition description information 13 for each can be added to the file 10.

In accordance with the processes shown in FIG. 3 or 5, the client 2 searches for the use condition description 30b from the use condition description information 13b for the HDD-PD service and determines the encryption key 20 from the use condition description 30b. The content decryption unit 40 then uses the encryption key 20 to decrypt the encrypted content in the file 10. As a result of the decryption, the content decryption unit 40 provides an audio signal, which is then output via, for example, the speaker 50 or the headphone.

Additionally, in the HDD-PD service, the user who has purchased the right to use the content can check out the content, stored on the HDD of the client 2, to the portable device 6 connected via the USB cable 5 (in step S23). Use conditions for the check-out and check-in in this case are described in the use condition description. At the portable device 6, an updated use condition description, which is searchable from use condition description information 13b' for the HDD-PD service, is described.

Next, a second specific example of the operation of the music-content management system 1 will be described with reference to FIG. 9. In the second specific example, after demo music content with a playback limit of one week in the EMD service is distributed to the client 2, the user copies a medium, such as a CD, to the client 2 through the HDD-PD service and plays back the content from the HDD or checks out the content to a portable device.

The content providing server 4 and the client 2 performs authentication processing as described above, and, in response to a request from the client 2, the content providing server 4 supplies the demo music content 12, together with the encryption system 11, to the client 2 through the network 3 (in step S31 in FIG. 9). The content providing server 4 also supplies the use condition description information 13a for the EMD service to the client 2.

The client 2 stores, in the file 10, the encryption system 11, the encrypted content (for preview) 12, and the use condition description information 13a for the EMD service which are sent in step S31 described above.

The demo music content is provided for free of charge or at low cost, and the playback limit of the demo music content is specified to be one week by the use condition description 30a that is searchable from the use condition description information 13a for the EMD service. Thus, after downloading the demo music content, the user at the client 2 can play back the demo music for free of charge or at low cost, but cannot listen to the demo music after one week.

When the user finds the demo music content his/her favorite, he or she purchases a medium 7 (such as a CD) storing the same content. Through the HDD-PD service, the client 2 compresses the content, read from the medium 7, by a predetermined compression system, encrypts the compressed content by a predetermined encryption system, and records the resulting content to the HDD (in step S32). In this case, in the HDD-PD service, the client 2 adds the use condition description information 13b for the HDD-PD service to the own file 10, in accordance with the content playback conditions. Since the encryption scheme is described in the file format, multiple pieces of use condition description information for each service can be added.

In accordance with the processes shown in FIG. 3 or 5, the client 2 searches for the use condition description 30b from the use condition description information 13b for the HDD-PD service and determines the encryption key 20 from the use condition description 30b. The content decryption unit 40 then uses the encryption key 20 to decrypt the encrypted content in the file 10. As a result of the decryption, the content decryption unit 40 provides an audio signal, which is then output via, for example, the speaker 50 or the headphone.

When the content is transferred or copied from the hard disk to the portable device 6, the use condition information is changed or updated and is recorded in the storage medium in the portable device 6 together with the content (in step S33).

Next, a third specific example of the operation of the music-content management system 1 will be described with reference to FIG. 10. In the third specific example, after demo music content with a playback limit of one week in the EMD service is distributed to the client 2, the client 2 passes the same file 10 to another client 120, so that the another client 120 plays back the music content. A second portable device (PD) 126, which serves as portable music playback equipment, is connected to the client 120 via a second USB (universal serial bus) cable 121.

The content providing server 4 and the client 2 performs authentication processing as described above, and, in response to a request from the client 2, the content providing server 4 supplies the demo music content 12, together with the encryption system 11, to the client 2 through the network 3 (in step S41 in FIG. 10). The content providing server 4 also supplies the use condition description information 13a for the EMD service to the client 2.

The client 2 stores, in the file 10, the encryption system 11, the encrypted content (for preview) 12, and the use condition description information 13a for the EMD service which are sent in step S41 described above.

The demo music content is provided for free of charge or at low cost, and the playback limit of the demo music content is specified to be one week by the use condition description 30a that is searchable from the use condition description information 13a for the EMD service. The user of the client 2 finds the demo music content his/her favorite and immediately purchases the right to use the content through the HDD-PD service (in step S42), so that the user can enjoy the same music content for an unlimited playback period. Upon the purchase of the content use-right in step S42, the client 2 adds the use condition description information 13b for the HDD-PD service, which information the client 2 has downloaded from the content provider, to the own existing file 10. Since the encryption scheme is described in the file format, multiple conditions for each service can be added. Naturally, in the HDD-PD service, the user who has purchased the right to use the content can check out the content, stored on the HDD of the client 2, to the portable device 6 connected via the USB cable 5. Use conditions for the check-out and check-in in this case are described in the use condition description. At the portable device 6, an updated use condition description, which is searchable based on use condition description information 13b' for the HDD-PD service, is described.

Next, the client 2 wishes to let his or her friend listen to the content, since the playback limit for preview in the EMD service is not yet reached. The file 10 has no description that restricts the passing the content to another client within the period of one week. Thus, the client 2, for example, copies the file 10 to pass the file 10 to the second client 120 (in step S44). The client 120 searches for the use condition description information 13 for the service from the file 10, obtains a use condition description from the information 13, and determines the encryption key 20 from information (found in the use condition description) for determining the encryption key 20. The content decryption unit 40 in the client 120 then uses the encryption key 20 to decrypt the encrypted content 12 in the file 10. As a result of the decryption, the content decryption unit 40 provides an audio signal, which is then output via, for example, the speaker or the headphone.

The second client 120, however, is not permitted to handle the HDD-PD service, which can be handled by the client 2. This is because the HDD-PD service use condition has a description indicating that only the self (i.e., the client 2 in this case) is allowed to rip the content to his or her portable device.

Thus, this description is based on the premise that the client has the right to use the content and the HDD-PD service can be used on the condition of purchase of the right. Thus, it is desirable that, when the music content in the file is used with the HDD-PD service being activated, the use condition generated by the client 2 contain a condition that prohibits another client from using the HDD-PD service. More specifically, such a condition can be described using the HDD identification code (HD-ID) of the internal or external HDD of the client 2, when the HDD-PD service use condition is generated by the client 2. An identification code that is unique to the client 2 may also be used.

When the HD-ID of the client 2 is associated with the integrity of the description, the integrity for only the client 2 is verified but the integrity for the client 120 cannot be verified. Accordingly, the second client 120 that has not purchased the right to use the content cannot use the HDD-PD service for the client 2 (in step S45).

As described above, the client 2 in the music-content management system 1 can use the same content in a single file even through different services. Further, the arrangement according to the exemplary embodiment of the present invention allows multiple use conditions that are different from each other for each service to be described in the format of one file. Further, this arrangement allows multiple use conditions that are different from each other for respective services to be added to and described in the format of one file. This arrangement also allows the handlings of encryption keys for respective services having different encrypted contents to be made dependent upon the respective services. This arrangement also allows a service to be added without a change in the file format.

Additionally, the music-content management system 1 allows the client 2 to use and playback the same content in a single file through different services.

What is claimed is:

1. A content-data processing apparatus for processing content data, the content data contained in a file received through a network and/or from a storage medium, in accordance with a use condition description corresponding to a type of service, the content-data processing apparatus comprising:
    a receiver configured to receive the file transmitted to the content-data processing apparatus;
    a data processor configured to process the content data by using the file for encrypting content, the file storing the encrypted content, a key that encrypted the content and existing use condition descriptions for transferring the content data in each of a broadcast-type service and a media-bind-type service, and configured to add information regarding additional use condition descriptions to the existing use condition descriptions for respective services to the file; and
    a playback unit configured to play back the processed content data to a user.

2. The content-data processing apparatus according to claim 1, wherein the file contains one type of content encryption system, one type of encrypted content, and multiple types of information regarding the use condition descriptions for each of the services.

3. The content-data processing apparatus according to claim 2, wherein the data processor is further configured to select information regarding a respective use condition description for a respective service that can be processed by the data processor from the multiple types of information regarding the use condition descriptions, the multiple types of information being stored in the file so as to correspond to the respective services.

4. The content-data processing apparatus according to claim 1, wherein the data processor is further configured to process each service, and the use condition description for each service comprises a content use condition description that is searchable from information regarding the use condition description for each service.

5. The content-data processing apparatus according to claim 4, wherein the data processor is further configured to process each service,
the use condition description for each service comprises information for determining the key that encrypted the content, and
the use condition for each service specifies a number of times the content data is allowed to be copied to a portable device.

6. The content-data processing apparatus according to claim 5, wherein the data processor is further configured to obtain the information regarding the use condition description for the service from the file, check the use condition description for the service from the information, determine the content encryption key from the use condition description for the service, and use the determined encryption key to decrypt the encrypted content.

7. The content-data processing apparatus according to claim 5, wherein the data processor is further configured to process each service, and the use condition description for each service comprises information for verification of integrity.

8. The content-data processing apparatus according to claim 7, wherein the data processor is further configured to obtain the information regarding the use condition description for the service from the file, check the integrity of the information regarding the use condition description, check the use condition description for the service, determine the content encryption key from the use condition description for the service, and use the determined encryption key to decrypt the encrypted content.

9. The content-data processing apparatus according to claim 1, wherein the data processor is further configured to execute, as the service, the broadcast-type service and a media-bind-type service.

10. The content-data processing apparatus according to claim 1, wherein the data processor is further configured to add further information regarding the use condition description to the file, when the data processor processes data that is transmitted to a data processing device that is external to the content-data processing apparatus.

11. The content-data processing apparatus according to claim 1, wherein the playback unit includes an amplifier circuit and a headphone jack.

12. A content-data processing method executed by a content-data processing apparatus to process content data, the content data contained in a file received through a network and/or from a storage medium, in accordance with a use condition description corresponding to a type of service, the content-data processing method comprising:
receiving the file transmitted to the content-data processing apparatus;
processing the content data by using the file for encrypting content, the file storing the encrypted content, a key that encrypted the content, and existing use condition descriptions for transferring the content data in each of a broadcast-type service and a media-bind-type service;
adding information regarding additional use conditions for respective services to the existing use condition descriptions stored in the file by the content-data processing apparatus; and
playing back the processed content data to a user by a playback unit,
wherein the processing comprises obtaining information regarding the use condition description for each service from the file, checking the use condition description for the service from the information regarding the use condition description, determining the content encryption key from the use condition description for the service, and decrypting the encrypted content by using the encryption key.

13. The content-data processing method according to claim 12, wherein the processing step further comprises:
checking integrity of the information regarding the use condition description between the step of obtaining the information regarding the use condition description; and
checking the use condition description for the service from the information regarding the use condition description.

14. A content-data management system, comprising:
a content-data processing apparatus configured to process content data, received through a network and/or from a storage medium, in accordance with a use condition description corresponding to a type of service, the content-data processing apparatus including
a data processor configured to process the content data by using a file for encrypting content, the file storing the encrypted content, a key that encrypted the content, and existing use condition descriptions for transferring the content data in each of a broadcast-type service and a media-bind-type service, and configured to add information regarding additional use condition descriptions to the existing use condition descriptions for respective services to the file, and
a playback unit configured to play back the processed content data to a user;
a providing server configured to supply content data to the content-data processing apparatus through the network; and
a portable device configured to receive the content data from the content-data processing apparatus, the portable device including
a flash memory configured to store the received content data, and
an electronically erasable programmable ROM (BEPROM) configured to store a file allocation table (FAT) identifying storage locations in the flash memory storing the content data.

15. A content-data management method executed by a content-data management system that comprises a content-data processing apparatus configured to process content data, the content data contained in a file received through a network and/or from a storage medium, in accordance with a use condition description corresponding to a type of service and a providing server configured to supply content data to the content-data processing apparatus through the network, the content-data management method comprising:
receiving the file transmitted to the content-data processing apparatus;
processing the content data by using the file for encrypting content, the file storing the encrypted content, a key that encrypted the content, and existing use condition descriptions transferring the content data in each of a broadcast-type service and a media-bind-type service;
adding information regarding additional use conditions for respective services to the existing use condition descriptions stored in the file by the content-data processing apparatus; and
playing back the processed content data to a user by a playback unit included in the content-data processing apparatus,
wherein the processing comprises obtaining information regarding the use condition description for each service from the file, checking the use condition description for the service from the information regarding the use condition description, determining the content encryption key from the use condition description for the service, and decrypting the encrypted content by using the content encryption key.

16. A non-transitory computer readable medium storing a content-data processing program that causes a content-data processing apparatus to process content data, the content data contained in a file received through a network and/or from a storage medium, in accordance with a use condition description corresponding to a type of service, the content-data processing program comprising instructions for:
receiving the file transmitted to the content-data processing apparatus;
analyzing the content data by using the file containing encrypted content data, a key that encrypted the content data, and existing use condition descriptions for transferring the content data in each of a broadcast-type service and a media-bind-type service; and
adding new use condition description corresponding to the type of service, other than the existing use condition descriptions for the respective services, for a new service to the file; and
playing back the analyzed content data to a user by a playback unit included in the content-data processing apparatus.

17. The non-transitory computer readable medium storing the content-data processing program according to claim 16, wherein the file contains one type of content encryption system, one type of encrypted content, and multiple types of information regarding the use condition descriptions for the respective services.

18. The non-transitory computer readable medium storing the content-data processing program according to claim 16, wherein the use condition description for each service comprises a content use condition description that is searchable from information regarding the use condition description for each service, the use condition description being stored in the file.

19. The non-transitory computer readable medium storing the content-data processing program according to claim 18, wherein the use condition description for each service further comprises information for determining the key that encrypted the content, and
the use condition for each service specifies a number of times the content data is allowed to be copied to a portable device.

20. The non-transitory computer readable medium storing the content-data processing program according to claim 19, wherein the information regarding the use condition description for the service is obtained from the file, the use condition description for the service is checked from the information, the content encryption key is determined from the use condition description for the service, and the determined encryption key is used to decrypt the encrypted content.

21. The non-transitory computer readable medium storing the content-data processing program according to claim 20, wherein the use condition description for the service comprises information for verification of integrity.

* * * * *